United States Patent
Movsisyan et al.

(10) Patent No.: US 10,802,839 B2
(45) Date of Patent: Oct. 13, 2020

(54) USER INTERFACE CUSTOMIZATION BASED ON USER TENDENCIES

(71) Applicant: VMware, Inc., Palo Alto, CA (US)

(72) Inventors: Vardan Movsisyan, Yerevan (AM); Gor Ghazarayan, Yerevan (AM)

(73) Assignee: VMWARE, INC., Palo Alto, CA (US)

( * ) Notice: Subject to any disclaimer, the term of this patent is extended or adjusted under 35 U.S.C. 154(b) by 201 days.

(21) Appl. No.: 15/357,242

(22) Filed: Nov. 21, 2016

(65) Prior Publication Data

US 2018/0143744 A1    May 24, 2018

(51) Int. Cl.
*G06F 3/0484* (2013.01)
*G06F 9/451* (2018.01)
*G06F 8/38* (2018.01)

(52) U.S. Cl.
CPC ............. *G06F 9/451* (2018.02); *G06F 8/38* (2013.01)

(58) Field of Classification Search
None
See application file for complete search history.

(56) References Cited

U.S. PATENT DOCUMENTS

| | | | | |
|---|---|---|---|---|
| 5,115,501 A * | 5/1992 | Kerr | ............. | G06F 9/453 |
| 5,625,783 A * | 4/1997 | Ezekiel | ............. | G06F 3/0482 345/902 |
| 6,057,836 A | 5/2000 | Kavalam et al. | | |
| 6,121,968 A * | 9/2000 | Arcuri | ............. | G06F 3/0482 715/825 |
| 6,263,217 B1 * | 7/2001 | Park | ............. | G06F 3/0482 455/566 |
| 6,418,424 B1 * | 7/2002 | Hoffberg | ............. | G06F 3/00 706/21 |
| 6,564,170 B2 * | 5/2003 | Halabieh | ............. | G06F 9/451 702/181 |
| 6,993,362 B1 * | 1/2006 | Aberg | ............. | G06F 3/0482 345/169 |
| 7,246,319 B2 * | 7/2007 | Alden | ............. | G06Q 10/06 715/738 |
| 7,263,662 B1 * | 8/2007 | Ballard | ............. | G06F 3/023 707/999.102 |
| 7,472,376 B2 * | 12/2008 | Burcham | ............. | G06F 9/44505 715/765 |
| 7,730,484 B2 * | 6/2010 | von Tetzchner | ............. | G06F 13/4027 715/744 |
| 8,095,890 B2 * | 1/2012 | Sekimoto | ............. | H04N 5/44543 715/810 |
| 8,626,141 B2 * | 1/2014 | Davies-Moore | ............. | G06F 3/04817 455/418 |
| 8,856,670 B1 * | 10/2014 | Thakur | ............. | G06F 9/451 715/765 |

(Continued)

FOREIGN PATENT DOCUMENTS

WO    WO-2017030566 A1 *    2/2017    ............. G06F 8/38

*Primary Examiner* — Yongjia Pan

(57) ABSTRACT

The present disclosure is related to devices, systems, and methods for user interface customization. An example device can include instructions executable by a processor to receive indications of user actions with respect to an application, wherein the actions are made using a plurality of selectable elements of an interface, determine a user tendency based on the user actions, and provide a customized interface to the user based on the determined user tendency, wherein the customized interface includes at least one customized selectable element.

18 Claims, 6 Drawing Sheets

(56) References Cited

U.S. PATENT DOCUMENTS

| | | | |
|---|---|---|---|
| 8,972,878 B2* | 3/2015 | Mohler | G06F 3/04817 715/765 |
| 9,311,417 B2* | 4/2016 | Alexander | G06F 16/954 |
| 9,378,467 B1 | 6/2016 | Chaiyochlarb et al. | |
| 9,405,427 B2* | 8/2016 | Curtis | G06F 3/0481 |
| 9,417,754 B2* | 8/2016 | Smith | G06F 3/0416 |
| 9,519,401 B2* | 12/2016 | Antipa | G06F 3/0482 |
| 9,569,069 B2* | 2/2017 | Balasaygun | G06F 3/0481 |
| 9,646,145 B2* | 5/2017 | Vida | G06F 21/32 |
| 2002/0057298 A1* | 5/2002 | Wassom | G06F 3/0481 715/825 |
| 2002/0152291 A1* | 10/2002 | Fernandez | G06F 9/44505 709/222 |
| 2003/0090515 A1* | 5/2003 | Chang | H04N 5/4401 715/745 |
| 2003/0098891 A1* | 5/2003 | Molander | G06F 3/0482 715/841 |
| 2003/0132970 A1* | 7/2003 | Lehmeier | G06F 9/453 715/789 |
| 2003/0145283 A1* | 7/2003 | Machida | G06F 19/00 715/234 |
| 2005/0054381 A1* | 3/2005 | Lee | G06F 3/011 455/557 |
| 2005/0108406 A1 | 5/2005 | Lee et al. | |
| 2006/0048060 A1* | 3/2006 | Mohr | G06F 9/451 715/747 |
| 2006/0107219 A1* | 5/2006 | Ahya | G06F 9/465 715/745 |
| 2007/0266330 A1* | 11/2007 | Friedland | G06Q 10/06 715/764 |
| 2008/0027924 A1* | 1/2008 | Hamilton | G06F 16/9535 |
| 2008/0163109 A1 | 7/2008 | Srivatsan et al. | |
| 2009/0150814 A1* | 6/2009 | Eyer | G06F 3/04842 715/765 |
| 2009/0327915 A1* | 12/2009 | Holdaway | G06F 9/451 715/745 |
| 2010/0332543 A1* | 12/2010 | Feng | H04L 67/22 707/781 |
| 2011/0028138 A1* | 2/2011 | Davies-Moore | G06F 3/04817 455/418 |
| 2011/0047478 A1 | 2/2011 | Ellsworth et al. | |
| 2011/0138328 A1* | 6/2011 | Ge | G06F 3/0482 715/811 |
| 2011/0320957 A1 | 12/2011 | Tiddens et al. | |
| 2012/0240065 A1* | 9/2012 | Linietsky | G06F 8/61 715/762 |
| 2014/0229848 A1* | 8/2014 | Zhang | H04L 67/22 715/745 |
| 2014/0351708 A1* | 11/2014 | Balasubramanyan | G06F 3/048 715/745 |
| 2015/0067531 A1* | 3/2015 | Adimatyam | G06F 3/0481 715/745 |
| 2015/0169285 A1* | 6/2015 | Reyes | G06F 3/167 715/728 |
| 2015/0189377 A1* | 7/2015 | Wheatley | H04N 21/44218 725/12 |
| 2016/0188144 A1* | 6/2016 | Pistoia | H04L 67/306 715/745 |
| 2016/0342314 A1* | 11/2016 | Dickerson | G06F 3/04845 |
| 2017/0075506 A1* | 3/2017 | O'Doherty | H04L 67/22 |

\* cited by examiner

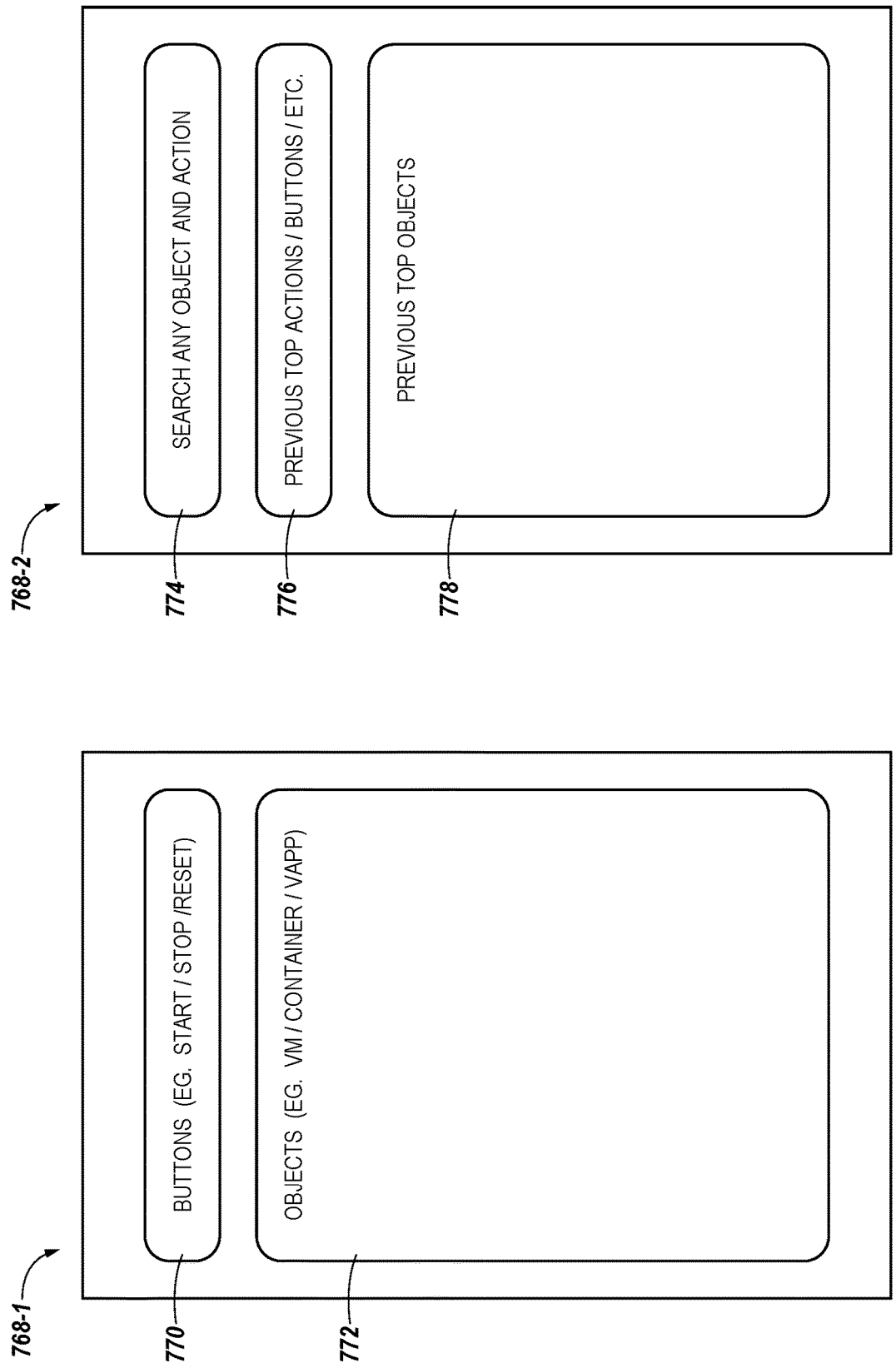

USER INTERFACE CUSTOMIZATION BASED ON USER TENDENCIES

BACKGROUND

A user interface can be used to interact with an application (e.g., product or service). Interactions may be made by the selection of selectable elements, such as selectable display elements in a graphical user interface or voice-selectable elements in an aural interface, for example. In order to provide desired utility, a user interface may include selectable elements organized in particular ways. In the example of a display, elements can be organized in different sizes, orientations, locations, orders, etc.

In previous approaches, the organization of selectable elements may be determined based on estimates and/or generalizations of what provides the most utility to users. Because these estimates are typically made at the product or service development, they may not reflect what individual users want in an organization. In some cases, users may be provided with an ability to manually modify such an organization. However, such modification may be time consuming and/or involve expertise the user may not possess.

BRIEF DESCRIPTION OF THE DRAWINGS

FIG. 7 illustrates examples of an interface and a customized interface according to the present disclosure.

DETAILED DESCRIPTION

Figure 1:
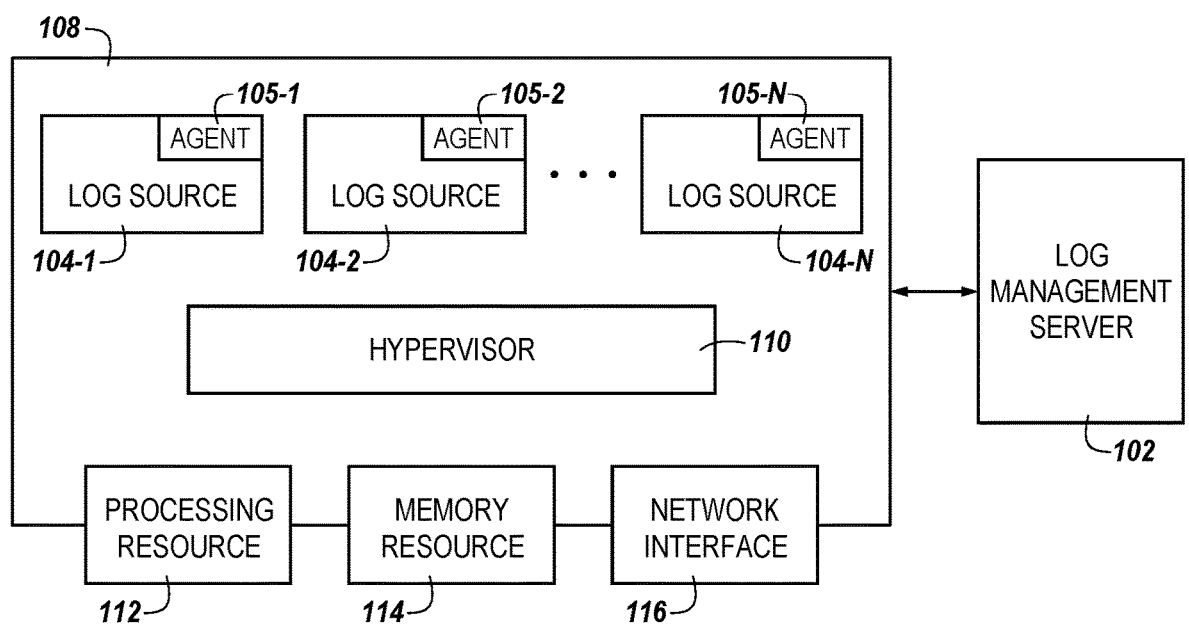
FIG. 1 is a diagram of an example of an infrastructure for user interface customization according to the present disclosure.

A log source, as used herein, refers to a source of one or more system logs (e.g., event and/or status logs). In general, a log source can refer to any entity capable of generating logs. For instance, a log source can be a server (e.g., a physical server), a virtual computing instance, an application, a host, a network device, a desktop computing device, an event channel, a log aggregator, a log file, etc. A log management server can monitor logs of, and/or configure, one or more log sources.

An "element" or a "selectable element" as referred to herein is an option capable of being selected by a user via an interface. Elements, upon being selected, can cause one or more actions to be performed with respect to an application. Actions refer to the execution of machine-readable instructions to perform some function (e.g., printing, copying, pasting, querying, etc.). In some embodiments, elements can refer to display elements (e.g., icons, buttons, tabs, menus, etc.). In some embodiments, elements can refer to selectable audio elements (e.g., voice-selectable elements). For example, selection of an "underline" element in a word processing application can cause subsequently-entered text and/or selected text to be underlined.

Logs can track user actions with respect to an application. For example, the selection of a selectable element can be logged. The selection of a plurality of selectable elements can be logged over a period of time (e.g., one or more sessions). The log(s) can indicate which elements the user selected, at what times, and at what frequency. Additionally, the logs can indicate a context in which elements were selected. Accordingly, embodiments herein can receive indications of user actions with respect to an application from a log associated with that application. From these actions, embodiments herein can determine preferences, habits, workflows, and/or behaviors (herein referred to as "tendencies") particular to the user. Tendencies can include, for example, user preferences for certain selectable elements, elements that the user selects more than other elements (or more frequently than other elements), and/or elements the user tends to select following the selection of other elements. Determining tendencies can include determining workflows, which can include the sequential selection of a plurality of elements (e.g., "view queries" followed by "view query3"). A determined tendency can include a series of compatible and/or logical actions. In some embodiments, compatible and/or logical actions may be actions that are related to one another in that they may affect similar objects, functionalities, and/or workflows.

Based on the determined tendencies, embodiments herein can provide a customized user interface to the user. In some embodiments the customized user interface can be provided in a subsequent session. In some embodiments the customized user interface can be provided in a same session or in real time (e.g., as elements are selected). Customization in accordance with embodiments herein can include the provision of an interface customized to a particular user based on that user's tendencies. Customization can also include the provision of an interface customized to a particular group of users based on those users' tendencies. Such a group can include users within the same organizational structure (e.g., department) and/or role (e.g., administrators).

A customized interface can include reorganized elements, added elements, removed elements, reordered elements, and/or modified elements (e.g., elements of different size, color, shape, etc.). In some embodiments a customized interface can include one or more elements that, upon being selected, perform a plurality of actions that previously required the selection of a plurality of elements before the interface was customized. For example, a single element can be provided in a customized interface that both italicizes text and changes its color to red if, for example, the user was previously determined to have performed these actions in sequence (e.g., performed them a number of times and/or at frequency exceeding a threshold).

Embodiments herein can provide customized interfaces without user input instructing the customization of the interface. In contrast to previous approaches where users seeking customization may need to manually alter existing application interfaces, embodiments herein can track user actions with respect to the application and automatically provide the functionality and/or utility associated with a customized interface. In contrast with macros, for instance, embodiments of the present disclosure need not be explicitly defined by the user. Additionally, while macros may be defined, and used, by a single user, embodiments herein can leverage the actions of a plurality of users. For example, the actions of a group of users (e.g., email server administrators)

can be logged and used to determine tendencies particular to the group. A customized interface can be provided to each member of the group, and, in some embodiments, the customized group interface can be further customized to suit each member of that group.

Embodiments of the present disclosure are not bounded by the limits of one application. Actions logged in one application can cause an interface associated with a different application to be customized. For example, if a user typically concludes a slideshow presentation in a first application and sends a copy of the slideshow to the guests of the presentation using a second application, embodiments of the present disclosure can determine this tendency and, in a subsequent instance, open a second application interface (e.g., an email application) responsive to the completion of a slideshow in the first application. In an example, the second application interface can include a first icon presented to the user, the selection of which causing the slideshow to attach to the email, and a second icon presented to the user, the selection of which causing the automatic population of the recipient field with addresses of the guests of the presentation.

Additionally, embodiments of the present disclosure can determine a context (e.g., a situational context) in which elements were selected. A context can include a view and/or a state of an interface during which the user performed one or more actions. Determining a context can allow the determination of tendencies in a particular situation or a particular group of related situations. Accordingly, a customized interface can allow the performance of different actions (e.g., via the provision of different selectable elements) than a non-customized interface in a same or similar context. For example, if a user gets an email from an officer at his company during working hours, the default actions and/or elements associated with the email notification may include "reply," "add note," and/or "add reminder," for instance. If the user tends to ignore emails from this particular officer (the sender), embodiments of the present disclosure can determine this tendency and, in a subsequent instance, provide actions and/or elements including "snooze" and/or "ignore," for instance. In some embodiments, the customized interface can provide an automatic reply from the user to the sender that reads "working on that," for example.

Customized interfaces in accordance with embodiments herein can streamline user interactions with applications. Increases in ease-of-use and corresponding decreases in delay can correlate to increased productivity for individual users and their organizations. Moreover, customization can be performed without users needing specialized computer knowledge, programming skills, and/or skill in modifying an interface. Where interfaces are provided in situations where display space is at a premium, such as in mobile devices (e.g., smart phones, tablets, wearable devices, personal digital assistants (PDAs), etc.), embodiments of the present disclosure can greatly enhance user experiences. For instance, instead of the user having to scroll through a list of many available element options when only a few are historically relevant to the user, the few instead of the many can be provided. In some embodiments, the most often used elements can be provided "on top" and lesser used elements can be provided below. Elements can be sorted based on their relevance and/or usage.

As referred to herein, the term "log source" can refer to a virtual computing instance (VCI), which covers a range of computing functionality. VCIs may include non-virtualized physical hosts, virtual machines (VMs), and/or containers. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in a software defined data center. In such a system, information can be propagated from an end user to at least one of the VCIs in the system, between VCIs in the system, and/or between at least one of the VCIs in the system and a management server. In some embodiments, the log management server can be provided as a VCI. Software defined data centers are dynamic in nature. For example, VCIs and/or various application services, may be created, used, moved, or destroyed within the software defined data center. When VCIs are created, various processes and/or services start running and consuming resources. As used herein, "resources" are physical or virtual components that have a finite availability within a computer or software defined data center. For example, resources include processing resources, memory resources, electrical power, and/or input/output resources.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 312 may reference element "12" in FIG. 3, and a similar element may be referenced as 412 in FIG. 4. A group or plurality of similar elements or components may generally be referred to herein with a single element number. For example a plurality of reference elements 104-1, 104-2, . . . , 104-N may be referred to generally as 104. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure, and should not be taken in a limiting sense.

FIG. 1 is a diagram of an example of an infrastructure for user interface customization according to the present disclosure. For example, FIG. 1 can be a diagram of a host 108 for user interface customization according to the present disclosure. The host 108 can include processing resources 112 (e.g., a number of processors), memory resources 114, and/or a network interface 116. Memory resources 114 can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. For example, the memory resources 114 may comprise primary and/or secondary storage.

The host 108 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 108 can incorporate a hypervisor 110 that can execute a number of VCIs 104-1, 104-2, . . . , 104-N that can each provide the functionality of a log source. As such, the VCIs may be referred to herein as "log sources." The log sources 104-1, 104-2, . . . , 104-N are referred to generally herein as "log sources 104." The log sources 104 can be provisioned with processing resources 112 and/or memory resources 114 and can communicate via the network interface 116. The processing resources 112 and the memory resources 114 provisioned to the servers 104 can be local and/or remote to the host 108. For example, in a software defined data center, the log sources 104 can be provisioned with resources that are generally available to the software defined data center and are not tied to any particular hardware device. By way of example, the memory resources 114 can include volatile and/or non-volatile memory available to the log sources 104. The log sources 104 can be moved to different hosts (not specifically illustrated), such that different hypervisors manage the log sources 104. In some embodiments, a log source among the number of log sources can be a master log source. For example, log sources 104-1 can be a master log sources, and log sources 104-2, . . . , 104-N can be slave log sources. In some embodiments, each log sources 104 can include a respective logging agent 105-1, 105-2, . . . , 105-N (referred to generally herein as logging agents 105) deployed thereon.

In some embodiments, each the log sources 104 can provide a same functionality. In some embodiments, one or more of the log sources 104 can provide a different functionality than another of the one or more log sources 104. For example, one or more of the log sources 104 can provide email functionality. In some embodiments, one or more of the log sources 104 are configured to selectively permit client login. In some embodiments, one or more of the log sources 104 are email log sources. In some embodiments, one or more of the log sources 104 are application log sources. In a number of embodiments, one or more of the log sources 104 can be servers, such as files servers, print servers, communication servers (such as email), remote access, and/or firewall, application servers, database servers, web servers, and others. Embodiments herein are not intended to limit the log sources 104 to a particular type and/or functionality.

The log sources 104 can each record and/or maintain a respective event log (herein referred to as a "log") which tracks events (e.g., actions, and/or activities) taking place on the respective log source. The logs can be recorded in real time, for instance. In some embodiments, the logs can track aspects of a number of applications and/or programs. In some embodiments, the logs can track physical and/or virtual hardware usage.

Events in the logs can be accompanied by event information. Event information included in each of the logs can include, for instance, a timestamp of an event, a source of the event, including, for instance, a particular code path (e.g., com.vmware.loginsight.action1), UI (e.g., $loginsight-url/admin/#element1), text associated with the event, and/or a name-value pair extracted from the event. In some embodiments, logs can be received by the log management server 102. In some embodiments, a client device (e.g., a computing device) can pull logs from the log management server 102. In some embodiments, the log management server 102 can push logs to a client device.

Figure 2:
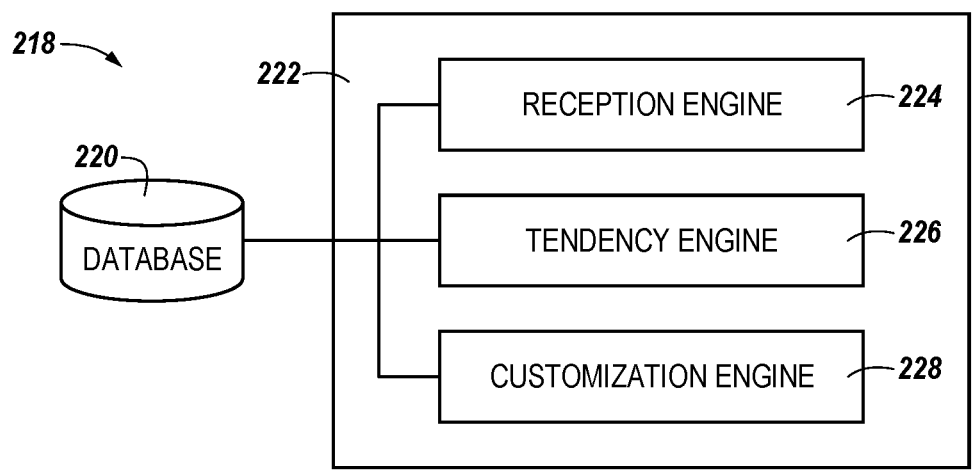
FIG. 2 is a diagram of a general logical system structure implementing user interface customization according to the present disclosure.

FIG. 2 is a diagram of a general logical system structure implementing user interface customization according to the present disclosure. For example, FIG. 2 can be a diagram of a system for user interface customization according to the present disclosure. The system shown in FIG. 2 can be implemented in a log management server, for instance, such as the log management server 102, previously discussed.

The system 218 can include a database 220, a subsystem 222, and/or a number of engines, for example a reception engine 224, a tendency engine 226, and/or a customization engine 228 and can be in communication with the database 220 via a communication link. The system 218 can include additional or fewer engines than illustrated to perform the various functions described herein. The system 218 can represent program instructions and/or hardware of a machine (e.g., machine 330 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines (e.g., 224, 226, 228) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the reception engine 224 can include a combination of hardware and program instructions that can be configured to receive indications of user actions with respect to an application, wherein the actions are made using a plurality of selectable elements of an interface. The interface can include a display, such as an application interface and/or a web page, for instance. The interface can include an audio interface such as in a voice-controlled application. As previously discussed, selectable elements can include selectable display elements and/or audio selectable elements. Display elements can be selected using one or more input devices, such as a touchscreen, mouse, keyboard, pointer, etc. Display elements refer to a selectable portion of a display, the selection of which causes an action to be performed with respect to the application. Examples of display elements include, but are not limited to, icons, buttons, tabs, lists, and menus. Audio selectable elements can be selected using recognized voice commands, for instance. It is noted, however, that embodiments herein do not limit selectable elements to a particular type, nor do embodiments herein limit the selection of elements to a particular manner using a particular device.

The indications of user actions can be received from a log associated with the application. In some embodiments, the log may be kept by the application itself. In some embodiments, the log may be received from another application and/or entity. In some embodiments, the indications may be received from a monitoring service that tracks user inputs.

In some embodiments, the tendency engine 226 can include a combination of hardware and program instructions that can be configured to determine a user tendency based on the user actions. Determining a tendency can include determining a subset of the plurality of selectable elements selected by the user a quantity of times exceeding a threshold. In some embodiments, determining the tendency can include determining a subset of the plurality of selectable elements selected by the user a quantity of times within a particular time period exceeding a threshold. As previously discussed, determining the tendency can include determining a workflow, which can include determining a sequence in which the user performed a set of actions. In an example, embodiments herein can determine that a user that is an administrator on call has a tendency to select a display element entitled "view queries" and then select "view query3."

In some embodiments, the customization engine 228 can include a combination of hardware and program instructions that can be configured to provide a customized interface to the user based on the determined user tendency, wherein the customized interface includes at least one customized selectable element. In some embodiments, the customized interface can be provided in a second session (where the determination of the user tendency is performed in a first session). Sessions can be defined by periods of usage and/or periods between a login and a sign out, though embodiments herein are not so limited. For instance, a second session can begin responsive to a request. In some embodiments, the customized interface can be provided in real time.

Customizing the selectable display element(s) can include providing display elements in the customized interface in a different size than in the interface before customization. For example, if a user highlights text and selects the "copy" element, embodiments herein can enlarge the "paste" element based on the user's past tendency to follow a "copy" action with a "paste action." In some embodiments, customizing the display element(s) can include providing display elements in the customized interface in a different color than in the interface before customization. In the above example, for instance, the "paste" element can be highlighted in a different color in lieu of, or in addition to, its change in size. In some embodiments, customizing the display element(s) can include providing display elements in the customized interface in a different order than the interface before customization. The customized order can correspond to a frequency in which elements were selected before customization. For example, most-often selected elements can be positioned toward the top of a display or played first in an aural interface.

Elements can be added and/or removed in the customized interface. For instance, if the user does not select a particular element over a threshold period of time, that element may be removed from (e.g., not presented in) the customized interface. Adding elements can include adding elements configured to perform a plurality of actions in some embodiments. As previously discussed, embodiments herein can determine a sequence in which the user performed a set of actions. The customized interface can then include a customized selectable element such that, upon being selected, the customized selectable element causes a performance of the sequence of the set of actions (e.g., "view queries" and "view query3").

Figure 3:
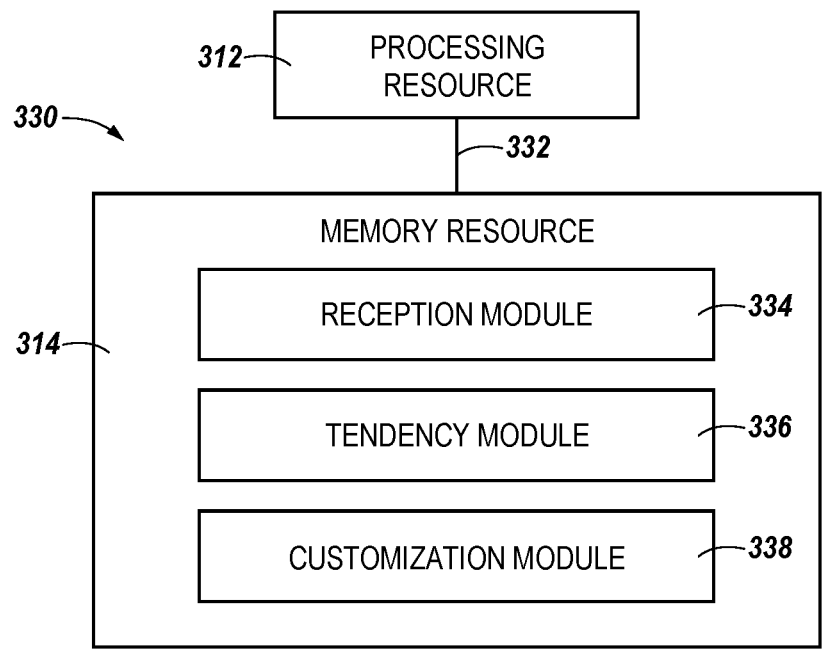
FIG. 3 is a diagram of an example system structure implementing user interface customization according to the present disclosure.

FIG. 3 is a diagram of an example system structure implementing user interface customization according to the present disclosure. For example, FIG. 3 can be a diagram of a machine for user interface customization according to the present disclosure. The machine 330 can utilize software, hardware, firmware, and/or logic to perform a number of functions. The machine 330 can be a combination of hardware and program instructions configured to perform a number of functions (e.g., actions). The hardware, for example, can include a number of processing resources 312 and a number of memory resources 314, such as a machine-readable medium (MRM) or other memory resources 314. The memory resources 314 can be internal and/or external to the machine 330 (e.g., the machine 330 can include internal memory resources and have access to external memory resources). The program instructions (e.g., machine-readable instructions (MM)) can include instructions stored on the MRM to implement a particular function (e.g., an action such as determining a user tendency based on user actions). The set of MRI can be executable by one or more of the processing resources 312. The memory resources 314 can be coupled to the machine 330 in a wired and/or wireless manner. For example, the memory resources 314 can be an internal memory, a portable memory, a portable disk, and/or a memory associated with another resource, e.g., enabling MM to be transferred and/or executed across a network such as the Internet. As used herein, a "module" can include program instructions and/or hardware, but at least includes program instructions.

The memory resources 314 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 312 can be coupled to the memory resources 314 via a communication path 332. The communication path 332 can be local or remote to the machine 330. Examples of a local communication path 332 can include an electronic bus internal to a machine, where the memory resources 314 are in communication with the processing resources 312 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 332 can be such that the memory resources 314 are remote from the processing resources 312, such as in a network connection between the memory resources 314 and the processing resources 312. That is, the communication path 332 can be a network connection. Examples of such a network connection can include a local area network (LAN), wide area network (WAN), personal area network (PAN), and the Internet, among others.

As shown in FIG. 3, the MRI stored in the memory resources 314 can be segmented into a number of modules 334, 336, 338 that when executed by the processing resources 312 can perform a number of functions. As used herein a module includes a set of instructions included to perform a particular task or action. The number of modules 334, 336, 338 can be sub-modules of other modules. For example, the tendency module 336 can be a sub-module of the customization module 338 and/or can be contained within a single module. Furthermore, the number of modules 334, 336, 338 can comprise individual modules separate and distinct from one another. Examples are not limited to the specific modules 334, 336, 338 illustrated in FIG. 3.

Each of the number of modules 334, 336, 338 can include program instructions and/or a combination of hardware and program instructions that, when executed by a processing resource 312, can function as a corresponding engine as described with respect to FIG. 2. For example, the reception module 334 can include program instructions and/or a combination of hardware and program instructions that, when executed by a processing resource 312, can function as the reception engine 224, the tendency module 336 can include program instructions and/or a combination of hardware and program instructions that, when executed by a processing resource 312, can function as the tendency engine 226, and/or the customization module 338 can include program instructions and/or a combination of hardware and program instructions that, when executed by a processing resource 312, can function as the customization engine 228.

Figure 4:
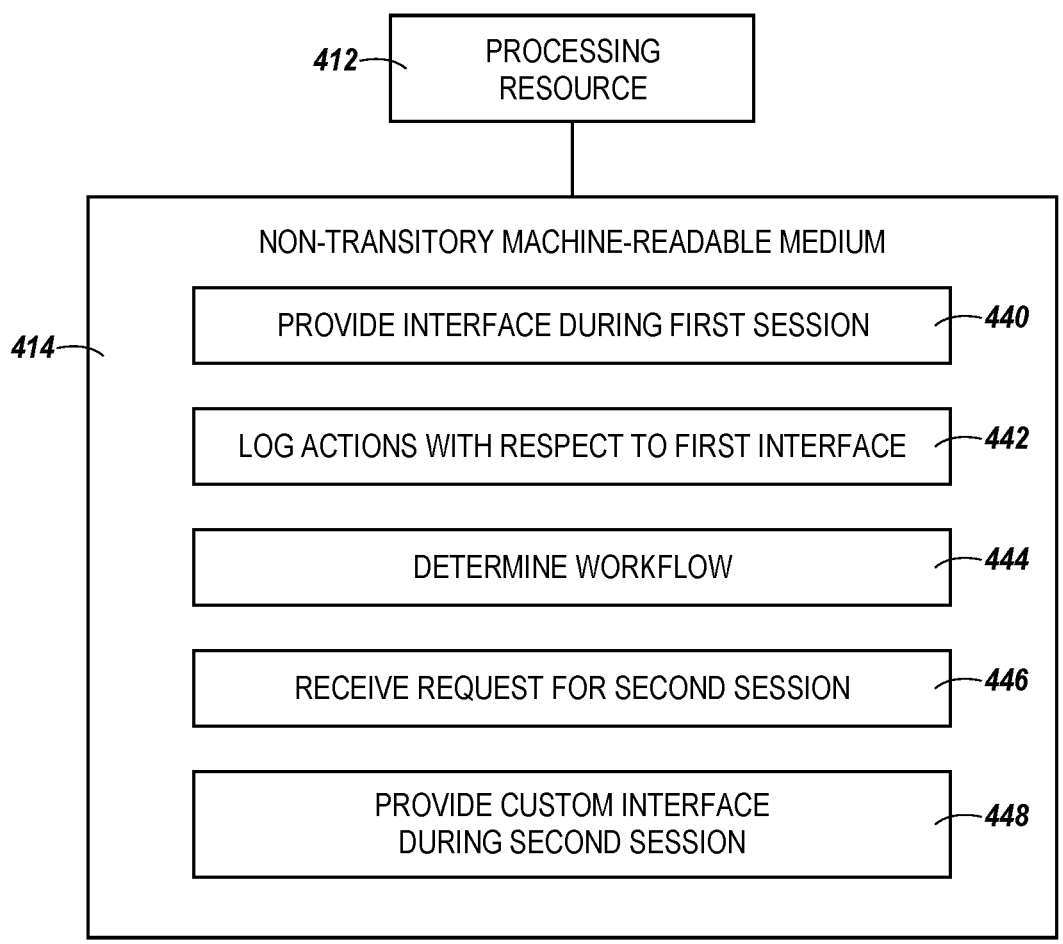
FIG. 4 illustrates a diagram of a non-transitory machine-readable medium for user interface customization according to the present disclosure.

FIG. 4 illustrates a diagram of a non-transitory machine-readable medium for user interface customization according to the present disclosure. The medium 414 can be part of a machine that includes a processing resource 412. The processing resource 412 can be configured to execute instructions stored on the non-transitory machine readable medium 414. For example, the non-transitory machine readable medium 414 can be any type of volatile or non-volatile memory or storage, such as random access memory (RAM), flash memory, read-only memory (ROM), storage volumes, a hard disk, or a combination thereof. When executed, the instructions can cause the processing resource 412 to provide user interface customization.

The medium 414 can store instructions 440 executable by the processing resource 412 to provide an application interface via a display during a first session, wherein the application interface includes a plurality of display elements displayed in a first orientation. The orientation, as referred to herein, includes an order of the display elements, a number of the display elements, an arrangement of the display elements, color(s) of the display elements, size(s) of the display elements, etc. As previously discussed, interfaces can be provided via audio (e.g., in aural interfaces). In some embodiments, interfaces can include both verbal and display elements capable of being selected. Embodiments of the present disclosure can present selectable options in interfaces, and in customized interfaces, via one or more displays and/or one or more aural interfaces. Where displays are discussed herein, it is to be understood that selectable elements are not limited to selectable display elements as embodiments of the present disclosure are not limited to display interfaces.

The medium 414 can store instructions 442 executable by the processing resource 412 to log a series of actions taken by a user with respect to the plurality of display elements of the application interface during the first session. The medium 414 can store instructions 444 executable by the processing resource 412 to determine a workflow associated with the user based on the series of actions, the workflow including a sequence in which the user took a subset of the series of actions. The medium 414 can store instructions 446 executable by the processing resource 412 to receive a request to begin a second session. The request can be associated with an authentication of the user to the application (e.g., a login), though embodiments herein are not so limited. The medium 414 can store instructions 448 executable by the processing resource 412 to provide a customized application interface via the display during the second session, wherein the customized application interface includes the plurality of display elements displayed in a second orientation based on the determined workflow. In some embodiments, the customized interface can be determined between the first session and the second session. In some embodiments, the customized interface can be determined during the first and/or second session.

The second orientation can be different from the first orientation with respect to an order of one or more of the display elements, a number of the display elements, an arrangement of the display elements, color(s) of one or more of the display elements, size(s) of one or more of the display elements, etc. In some embodiments the medium 414 can include instructions to display, in the customized application interface, a prioritization of a subset of the plurality of display elements corresponding to the subset of the series of actions.

Embodiments herein can customize interfaces across a number of sessions and/or through a number of iterations. For instance, embodiments of the present disclosure can log an additional series of actions taken by the user with respect to the plurality of display elements of the customized application interface during the second session, determine an additional workflow associated with the user based on the additional series of actions, the additional workflow including a sequence in which the user took a subset of the additional series of actions, receive a request to begin a third session, and provide a further customized application interface during the third session, wherein the further customized application interface includes the plurality of display elements displayed in a third orientation based on the additional workflow. In some embodiments, the further customized application interface can include the plurality of display elements displayed in a fourth orientation based on the workflow and the additional workflow. Thus, further customization can be provided as the user uses the customized interface and interacts with the selectable elements therein.

It is noted that in some embodiments, customized interfaces can be provided based on factors in addition to, or in lieu of, user actions with respect to the application itself. For instance, a customized interface can be determined based on an interface (e.g., a consensus interface) used by other members of a group of which the user is a part (e.g., email server administrators). In some embodiments, a customized interface can be determined based on a role associated with the user (e.g., a title and/or job description of the user). Such an interface may be presented to a user who is new to the interface, the group, and/or an entity controlling the group, for instance. Thus, embodiments herein can leverage the historical actions of similarly-situated users to provide more useful interfaces to new users.

Methods in accordance with embodiments herein can be performed by one or more computing devices and can include logging actions of a first user with respect to an application, wherein the actions are performed via selections of a plurality of display elements of an interface, determining a workflow corresponding to the first user based on the actions, wherein the workflow includes a sequential selection of a first display element and a second display element, receiving, subsequent to the determination of the workflow, an indication of a selection of the first display element by the first user, and customizing the interface for the first user such that a visual property of the second display element is changed. Changing the visual property of the second display element can include repositioning the second display element towards a top of the interface, such as that discussed below in connection with FIGS. 5 and/or 6, highlighting the second display element, changing a color and/or size of the second display element, etc.

In some embodiments, methods can include customizing the interface for the first user such that a visual property of a third display element is changed, wherein the third display element corresponds to an action determined to be an alternative to an action performed via a selection of the second display element. In some embodiments, the action determined to be an alternative to the action performed via the selection of the second display element is a next most probable action (e.g., a second-most used action). In some embodiments, the action determined to be the alternative to the action performed via the selection of the second display element is mutually exclusive with respect to the action performed via the selection of the second display element.

Figure 5:
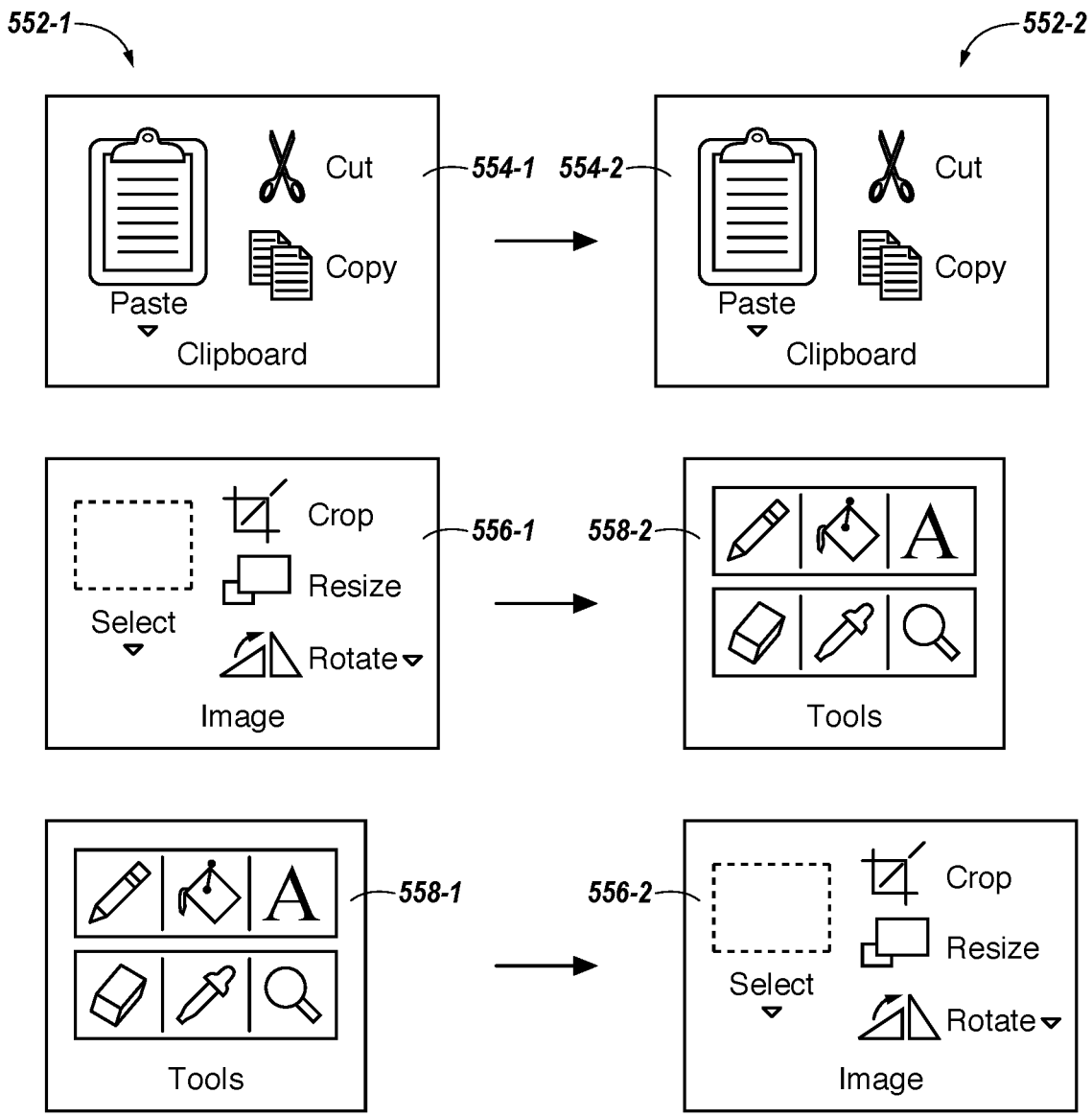
FIG. 5 illustrates examples of an interface and a customized interface according to the present disclosure.

FIG. 5 illustrates examples of an interface 552-1 and a customized interface 552-2 according to the present disclosure. The interface 552-1 can be an interface of an application with which a user interacts and user actions with respect to the application can be logged. Accordingly, the interface 552-1 can be a default interface or a customized interface in accordance with embodiments herein. For purposes of clarity, however, the interface 552-1 is discussed herein in the context of a default or "normal" interface.

As shown in FIG. 5, the interface 552-1 includes a first orientation of three groups of display elements: a first group of display elements 554-1 above a second group of display elements 556-1 above a third group of display elements 558-1. In the example illustrated in FIG. 5, user selections of the display elements of the three groups 554-1, 556-1, 558-1 are logged as the user interacts with the interface 552-1. During that interaction, the user selects elements of the first group 554-1 the most, elements of the third group 558-1 the second most, and elements of the second group 556-1 the third most.

Accordingly, a customized interface 552-2 can be provided (in some embodiments in real time, in some embodiments in a subsequent session) that includes a second orientation of the three groups of display elements 554-2, 556-2, 558-2. Because elements of the first group 554-1 were selected the most, the first group 554-2 in the customized interface 552-2 remains prioritized (on top). However, the second group 556-2 and the third group 558-2 in the customized interface 552-2 have swapped positions, giving priority to the third group 558-2 which had more selected elements therein.

Figure 6:
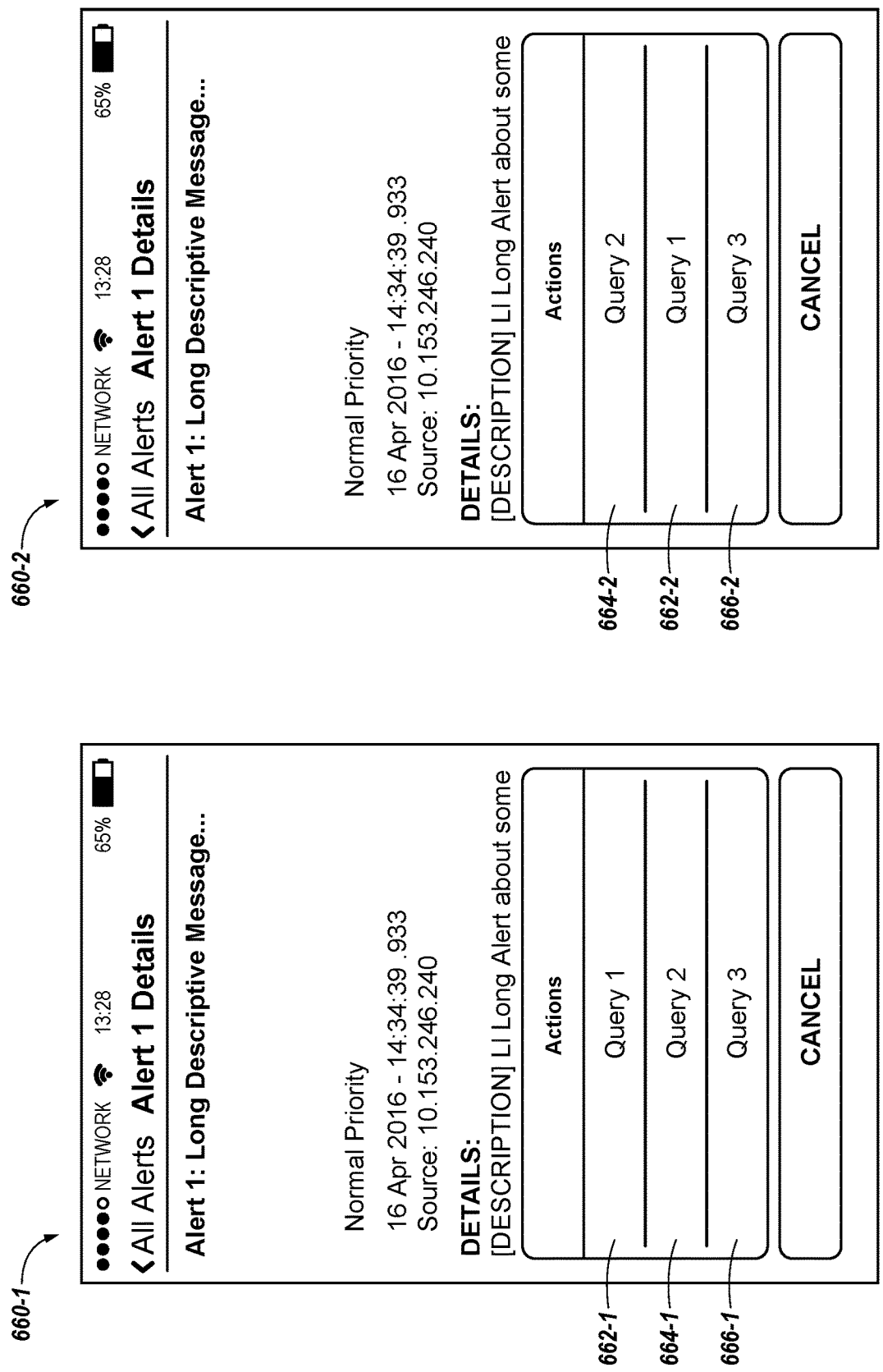
FIG. 6 illustrates examples of a mobile interface and a customized mobile interface according to the present disclosure.

FIG. 6 illustrates examples of a mobile interface 660-1 and a customized mobile interface 660-2 according to the present disclosure. The interface 660-1 can be an interface of a mobile application with which a user interacts and user actions with respect to the application can be logged. Accordingly, the interface 660-1 can be a default interface or a customized interface in accordance with embodiments herein. For purposes of clarity, however, the interface 660-1 is discussed herein in the context of a default or "normal" interface.

As shown in FIG. 6, the interface 660-1 includes a first orientation of three display elements: a query1 element 662-1 above a query2 element 664-1 above a query3 element 666-1. In the example illustrated in FIG. 6, user selections of the three elements 662-1, 664-1, 666-1 are logged as the user interacts with the interface 660-1. During that interaction, the user selects the query2 element 664-1 the most, the query1 element 662-1 the second most, and the query3 element 666-1 the third most.

Accordingly, a customized interface 660-2 can be provided (in some embodiments in real time, in some embodiments in a subsequent session) that includes a second orientation of the three elements 662-2, 664-2, 666-2. Because the query2 element 664-1 was selected the most, the query2 element 664-2 in the customized interface 660-2 moves to the top. Accordingly, the query2 element 664-2 and the query1 element 662-2 in the customized interface 660-2 have swapped positions.

FIG. 7 illustrates examples of an interface 768-1 and a customized interface 768-2 according to the present disclosure. The interface 768-1 can be an interface of an application with which a user interacts and user actions with respect to the application can be logged. Accordingly, the interface 768-1 can be a default interface or a customized interface in accordance with embodiments herein. For purposes of clarity, however, the interface 768-1 is discussed herein in the context of a default or "normal" interface. The interfaces 768 can be interfaces (e.g., dashboards) associated with an infrastructure management application, for instance, though embodiments of the present disclosure are not so limited.

As shown in FIG. 7, the interface 768-1 includes two display portions. A first portion 770 can include a plurality of selectable display elements (referred to as buttons for the purposes of FIG. 7). The buttons can be associated with functionalities corresponding to one or more log sources such as "start," "stop," "reset," etc. A second portion 772 can include selectable display elements corresponding to objects, such as VCIs, containers, vApps (e.g., VMs that combine applications with the operating systems they require), etc.

In the example illustrated in FIG. 7, user selections of the display elements of the first portion 770 and the second portion 772 are logged as the user interacts with the interface 768-1. During that interaction, the user selects some objects in the second portion 772 and then selects one or more actions from the first portion 770 to perform on those objects.

Accordingly, the customized interface 768-2 can be provided (in some embodiments in real time, in some embodiments in a subsequent session) that includes a third portion 776 and a fourth portion 778. The third portion 776 can include the buttons selected the most from the first portion 770 of the interface 768-1 (e.g., "top" buttons). The fourth portion 778 can include the selectable display elements selected the most from the second portion 772 (e.g., "top" objects). Elements or buttons not appearing in either the third portion 776 or the fourth portion 778 may be hidden and/or accessed through alternative pathways (e.g., the fifth portion 774, discussed below).

In addition, the customized interface 768-2 can include a fifth portion 774 configured to allow a user to readily locate and/or initiate one or more aspects (e.g., actions, functionalities, objects, buttons, etc.) of the application. For example, the fifth portion 774 can be a searching functionality (e.g., search bar) configured to search for objects and/or actions of the application (e.g., "auto-remedy critical-vapp-1"). Accordingly, in an example, rather than having to scan the second portion 772 for a desired object, the customized interface 768-2 can allow the user to input one or more characters of the desired object into the fifth portion 774 to locate and/or initiate it.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium having instructions stored thereon executable by a processor to:
   receive indications of a first set of user actions with respect to a first application during a first session, wherein the first set of user actions are made using a plurality of selectable elements of an interface of the first application;
   receive indications of a second set of user actions with respect to a second application different than the first application during the first session, wherein the second set of user actions are made using a plurality of selectable elements of an interface of the second application subsequent to the first set of user actions;
   autonomously determine a user tendency based on the first and second sets of user actions, wherein the user tendency includes a sequence in which a user took the first and second sets of user actions; and
   autonomously provide a customized interface of the second application to the user based on the determined user tendency upon receiving an indication that the first set of user actions with respect to the first application is completed during a second session, wherein the customized interface of the second application includes at least one customized selectable icon that represents the second set of user actions corresponding to the second application, wherein the customized selectable icon, upon being selected, is to autonomously execute at least one of the second set of user actions.

2. The medium of claim 1, including instructions to receive the indications from logs associated with the first and second applications.

3. The medium of claim 1, wherein the instructions to autonomously determine the user tendency based on the first and second sets of user actions include instructions to determine the plurality of selectable elements of the interfaces of the fit and second applications selected by the user a quantity of times exceeding a threshold.

4. The medium of claim 1, wherein the instructions to autonomously determine the user tendency based on the first and second sets of user actions include instructions to determine the plurality of selectable elements of the interfaces of the fits and second applications selected by the user a quantity of times within a particular time period exceeding a threshold, and wherein the instructions to provide the customized interface of the second application include instructions to provide a subset of the plurality of selectable display elements corresponding to the second set of user actions in an order corresponding to a frequency of selection.

5. The medium of claim 1, including instructions to receive the indications of the first and second sets of user actions and provide the customized interface of the second application to the user in real time.

6. The medium of claim 1, wherein the instructions to autonomously determine the user tendency include instructions to determine the sequence in which the user performed the second set of user actions; and
   wherein the instructions to autonomously provide the customized interface of the second application include instructions to provide the at least one customized selectable icon such that, upon being selected, the customized selectable element causes a performance of the sequence of the second set of user actions.

7. The medium of claim 1, including instructions to:
   provide the interface of the first application and the interface of the second application via one of a computing device and a mobile device; and
   autonomously provide the customized interface via one of the computing device or the mobile device.

8. A system for user interface customization, comprising:
   a processing resource; and
   a memory resource configured to store instructions which, when executed by the processing resource, cause the processing resource to:
   provide a first application interface via a display during a first session;
   provide a second application interface, different than the first application interface, via the display during the first session, wherein the second application interface includes a plurality of display elements displayed in a first orientation;
   log a first series of actions taken by a user with respect to a plurality of display elements of the first application interface during the first session;
   log a second series of actions taken by the user subsequent to the first series of actions with respect to a subset of the plurality of display elements of the second application interface during the first session;
   autonomously determine a workflow associated with the user based on the first and second series of actions, the workflow including a sequence in which the user took the first and second series of actions;
   receive an indication of a completion of the first series of actions with respect to the first application interface during a second session; and
   autonomously provide a customized second application interface via the display during the second session upon receiving the indication, wherein the customized second application interface prioritizes display of the subset of the plurality of display elements of the second application interface and includes the subset of the plurality of display elements of the second application interface displayed in a second orientation based on the determined workflow, wherein the customized second application interface includes at least one customized selectable icon that represents the second series of actions corresponding to the second application interface, and wherein the customized selectable icon, upon being selected, is to autonomously execute at least one of the second series of user actions.

9. The system of claim 8, including instructions to display a prioritization of the subset of the plurality of display elements of the second application interface corresponding to the second series of actions.

10. The system of claim 8, wherein:
at least one of the plurality of display elements of the second application interface is displayed in a first size in the first orientation and a second size in the second orientation; or
at least one of the plurality of display elements of the second application interface is displayed using a first color in the first orientation and a second color in the second orientation.

11. The system of claim 8, including instructions to autonomously determine the customized second application interface between the first session and the second session.

12. The system of claim 8, including instructions to:
log a third series of actions taken by the user with respect to the plurality of display elements of the customized second application interface during the second session;
autonomously determine an additional workflow associated with the user based on the third series of actions, the additional workflow including a sequence in which the user took the third series of actions;
receive an indication of a completion of the second series of actions during a third session; and
autonomously provide a further customized second application interface during the third session upon receiving the indication, wherein the further customized second application interface includes the plurality of display elements of the second application interface displayed in a third orientation based on the additional workflow.

13. The system of claim 12, wherein the further customized second application interface includes the plurality of display elements of the second application interface displayed in a fourth orientation based on the workflow and the additional workflow.

14. The system of claim 8, including instructions to autonomously provide another customized application interface based on the first application interface or the second application interface via the display based on:

a consensus interface used by a plurality of users of a group that includes the user, or
a role associated with the user.

15. A method for user interface customization, comprising:
logging actions of a first user with respect to a first application during a first session, wherein the actions are performed via selections of a plurality of display elements of an interface of the first application;
logging actions of the first user with respect to a second application different than the first application during the first session, wherein the actions are performed subsequent to actions of the first user with respect to the first application and via selections of a plurality of display elements of an interface of the second application;
autonomously determining a workflow corresponding to the first user based on the actions with respect to the first and second applications, wherein the workflow includes a sequential selection of a first display element of the interface of the first application and a second display element of the interface of the second application;
receiving, subsequent to the determination of the workflow, an indication of a selection of the first display element by the first user during a second session; and
upon receiving the indication of the selection of the first display element, autonomously customizing the interface of the second application for the first user such that display of the second display element is prioritized and a visual property of the second display element is changed based on the determined workflow, wherein the customized interface of the second application includes at least one customized selectable icon that represents the actions corresponding to the second application, and wherein the customized selectable icon, upon being selected, is to autonomously execute at least one of the actions corresponding to the second application.

16. The method of claim 15, wherein autonomously customizing the interface of the second application includes repositioning the second display element towards a top of the interface of the second application.

17. The method of claim 15, wherein autonomously customizing the interface of the second application includes highlighting the second display element.

18. The method of claim 15, wherein the method includes autonomously customizing the interface of the second application for the first user such that a visual property of a third display element is changed, wherein the third display element corresponds to an action determined to be an alternative to an action performed via a selection of the second display element.

* * * * *